United States Patent
Suzuki et al.

(10) Patent No.: US 7,606,972 B2
(45) Date of Patent: Oct. 20, 2009

(54) STORAGE UNIT, INFORMATION PROCESSING APPARATUS, AND EJECT CONTROL METHOD FOR STORAGE UNIT

(75) Inventors: Noriyuki Suzuki, Tokyo (JP); Tadashi Takayama, Kanagawa (JP); Takeshi Toyama, Kanagawa (JP); Hiroyasu Ito, Kanagawa (JP); Makoto Kobayashi, Kanagawa (JP); Tomoyuki Takada, Tokyo (JP); Kyohei Inukai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 10/628,404

(22) Filed: Jul. 29, 2003

(65) Prior Publication Data
US 2004/0024965 A1   Feb. 5, 2004

(30) Foreign Application Priority Data
Jul. 31, 2002   (JP)   ............................. 2002-223734

(51) Int. Cl.
*G06F 13/00*   (2006.01)
(52) U.S. Cl. ...................................... 711/115; 711/112
(58) Field of Classification Search ................. 711/112, 711/115
See application file for complete search history.

(56) References Cited

U.S. PATENT DOCUMENTS

| | | | | |
|---|---|---|---|---|
| 5,444,690 A | * | 8/1995 | Childers et al. | ............. 720/673 |
| 5,654,839 A | * | 8/1997 | Tanaka et al. | ................. 360/71 |
| 6,944,734 B2 | * | 9/2005 | Anzai et al. | .................. 711/163 |
| 2002/0032839 A1 | * | 3/2002 | Yamamoto et al. | .......... 711/118 |
| 2004/0037174 A1 | * | 2/2004 | Uchida et al. | ............ 369/30.36 |

FOREIGN PATENT DOCUMENTS

| | | |
|---|---|---|
| EP | 717409 | 6/1996 |
| JP | 8-167273 | 6/1996 |
| JP | 8-263383 | 10/1996 |
| JP | 10-301719 | 11/1998 |
| JP | 2000-276258 | 10/2000 |
| JP | 2001-350548 | 12/2001 |
| JP | 2001-357587 | 12/2001 |
| WO | 01/97002 | 12/2001 |

OTHER PUBLICATIONS

Japanese Official Action, Jan. 25, 2008.

* cited by examiner

*Primary Examiner*—Matt Kim
*Assistant Examiner*—Mardochee Chery
(74) *Attorney, Agent, or Firm*—Fitzpatrick, Cella, Harper & Scinto (57) ABSTRACT

A removable hard disk drive is detachable from a computer apparatus, and includes a storage medium for storing data from the computer apparatus and a communication interface with the computer apparatus. Upon reception of eject instruction issued by the computer apparatus, the removable hard disk drive writes contents cashed in a cache memory into a disk, and shifts to an ejectable state. Upon the completion of the shift to the ejectable state, the removable hard disk drive externally outputs an eject signal. A microprocessor which controls an eject mechanism executes removable hard disk cartridge eject operation in response to the eject signal.

14 Claims, 11 Drawing Sheets

STORAGE UNIT, INFORMATION PROCESSING APPARATUS, AND EJECT CONTROL METHOD FOR STORAGE UNIT

FIELD OF THE INVENTION

The present invention relates to a portable storage unit, an information processing apparatus having an eject mechanism for the storage unit, and an eject control method.

BACKGROUND OF THE INVENTION

There is known a portable storage unit which allows the user to exchange not only the storage medium but also the entire storage device. For example, Japanese Patent Laid-Open No. 8-167273 discloses a card type disk unit complying with PCMCIA standards. On Mar. 6, 2002, iVDR Hard Disk Drive Consortium (http://www.ivdr.org) has released a portable storage unit based on a 2.5″ hard disk unit ("iVDR" is a trademark of iVDR Hard Disk Drive Consortium).

When the whole storage device is exchanged instead of just the storage medium, since the storage device does not have any eject mechanism, an eject mechanism must be arranged outside to eject it. For example, Japanese Patent Laid-Open No. 10-301719 discloses in FIG. 3 an arrangement in which a disk drive is ejected by driving an eject mechanism on the basis of a control signal output from a drive controller. Japanese Patent Laid-Open No. 2000-276258 discloses in FIG. 1 an arrangement in which a dummy IDE device detects depression of an eject switch, and an eject mechanism is driven on the basis of a control signal output from the dummy IDE device to eject a docked IDE device.

In a portable storage unit such as a CD-ROM drive or MO drive in which only a storage medium is replaced, the storage medium can be ejected by operating an eject button or the like, or an eject command exchanged via an interface such as ATA or SCSI which connects the portable storage unit and a host apparatus such as a personal computer.

In the above references, a control signal for driving the eject mechanism is output from a block different from a disk drive (IDE drive). The block is not connected to an interface signal such as ATA or SCSI, or even if the block is connected, it does not receive any eject command. Eject by an eject command is not executed.

Considering the versatility of the unit, it is desirable to connect a portable storage unit including a storage device and eject mechanism and a host apparatus by a single interface signal such as ATA or SCSI. In the above references, only the storage device is connected by an interface signal such as ATA or SCSI, and connected by a signal line different from that of the eject mechanism.

In the above references, the storage device such as a disk drive and the eject mechanism are separately controlled. That is, even while the storage device performs storage operation, it can be ejected. If eject operation is executed at an improper timing, data to be stored is lost without being stored, and in the worst case, the unit is damaged. The host apparatus may monitor operation to the storage device, and allow eject only when no operation (particularly write operation) is done. Almost all recent storage devices such as a disk drive are equipped with write cache memories. Even if the host apparatus determines that write operation has ended, write of data in the cache memory may actually be in progress, failing to cope with all situations.

Accordingly, it is desired to overcome the conventional drawbacks. Especially, it is desired to allow ejecting a mounted storage unit by an eject command via an interface which connects an information processing apparatus and the detachable storage unit.

Also, it is desired that the above information processing apparatus and storage unit are connectable by a single interface.

Also, it is desired that the storage unit is always safely ejected from the information processing apparatus regardless of the eject instruction timing.

SUMMARY OF THE INVENTION

According to one aspect of the present invention, there is provided a storage unit which is detachable from an information processing apparatus, and has a storage medium for storing data from the information processing apparatus and a communication interface with the information processing apparatus, comprising: input means for inputting eject instruction; and output means for externally outputting an eject permission signal in accordance with input of the eject instruction.

According to another aspect of the present invention, there is provided an eject control method for a storage unit which is detachable from an information processing apparatus, and has a storage medium for storing data from the information processing apparatus and a communication interface with the information processing apparatus, comprising: a providing step of causing the information processing apparatus to provide a user interface; an issuing step of issuing eject instruction to the storage unit in accordance with user operation to the user interface; a state shift step of shifting the storage unit to an ejectable state in accordance with the eject instruction issued in the issuing step; an output step of causing the storage unit to output an eject permission signal to the information processing apparatus in accordance with the eject instruction; and an eject step of causing the information processing apparatus to eject the storage unit on the basis of the eject permission signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
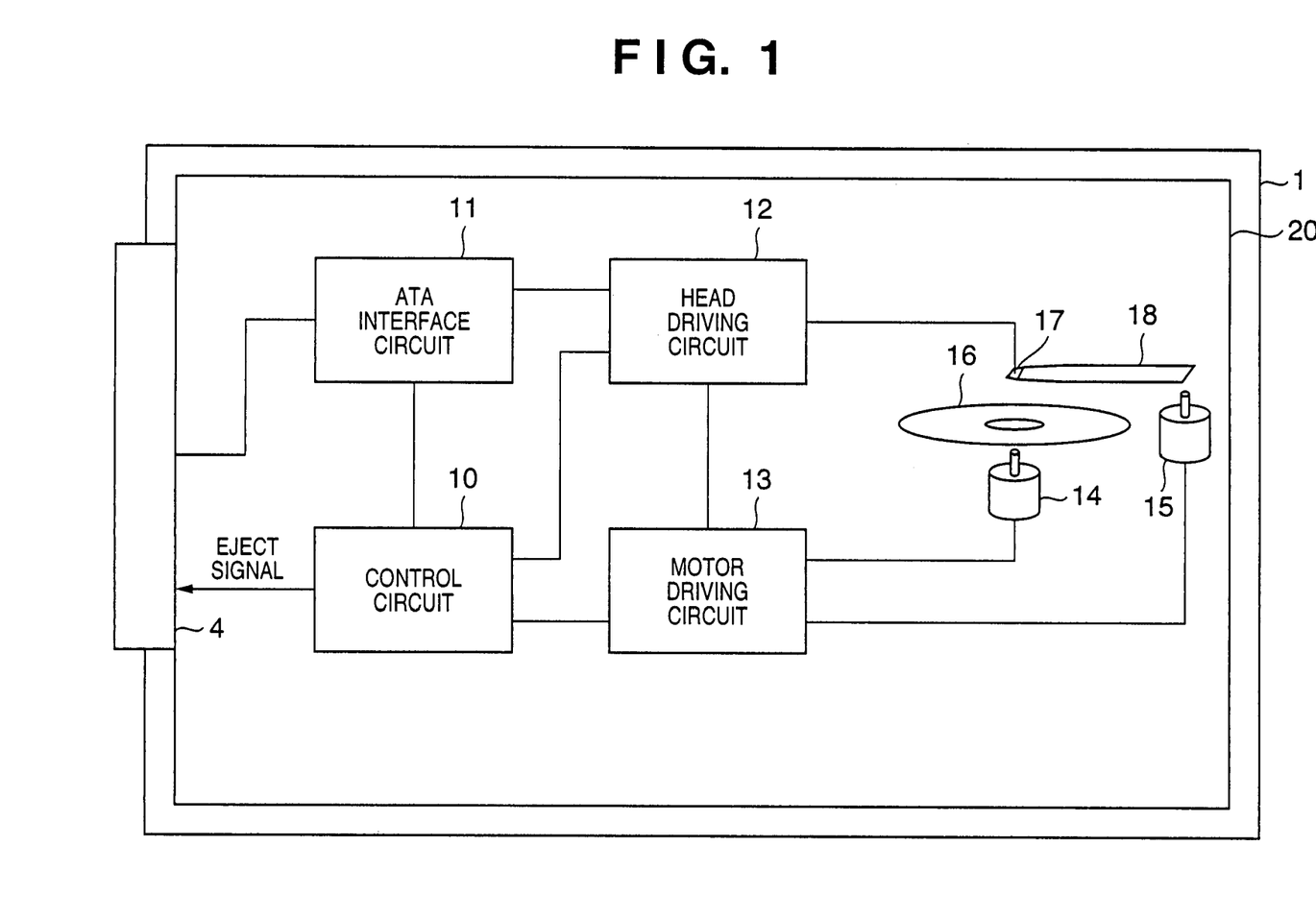
FIG. 1 is a view showing the arrangement of a removable hard disk cartridge according to the first embodiment.
Figure 2:
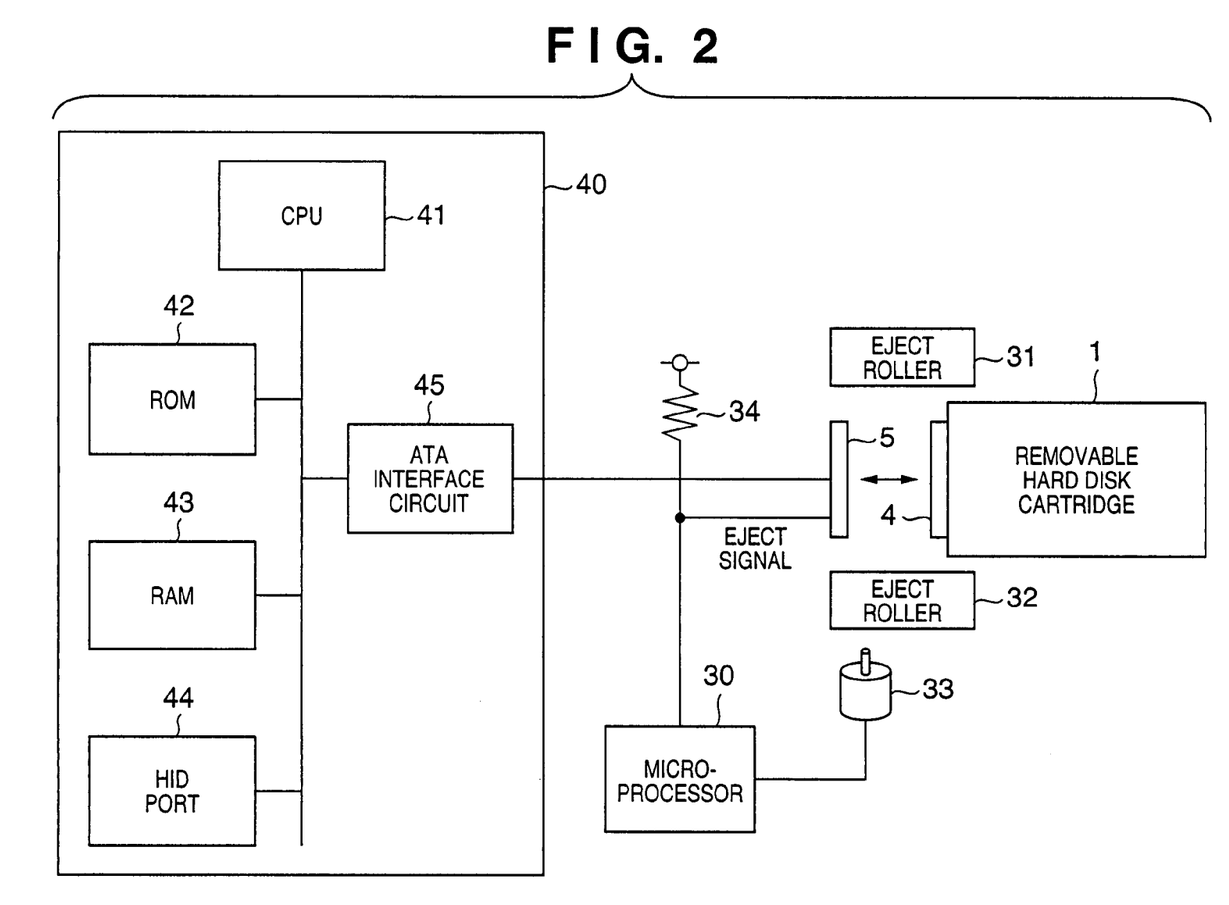
FIG. 2 is a view showing the arrangement of a host apparatus according to the first embodiment.

FIGS. 1 and 2 are views showing a portable storage unit according to the first embodiment. FIG. 1 shows the arrangement of a removable hard disk cartridge 1 as a portable storage cartridge. In FIG. 1, reference numerals 10 to 18 denote building components of a hard disk drive 20. The hard disk drive 20 is stored in a housing made of a mold member or the like, and constitutes the removable hard disk cartridge 1. An opening is formed in one surface at the end of the housing, and a connector 4 for connecting a main body apparatus (to be described later) is fitted in the opening.

The building components of the hard disk drive 20 will be explained. Reference numeral 10 denotes a control circuit which controls the overall cartridge and has a CPU, ROM, RAM, I/O port, and the like integrated on one chip. The control circuit 10 is connected to an ATA interface circuit 11, head driving circuit 12, and motor driving circuit 13. The motor driving circuit 13 drives and controls motors 14 and 15. The motor 14 engages with a magnetic storage medium (platter) 16, whereas the motor 15 engages with a head arm 18. The motors 14 and 15 realize rotation operation of the platter 16 and seek operation of the head arm 18, respectively.

The head driving circuit 12 drives and controls a magnetic head 17, and realizes data read/write at a desired position on the platter 16. Read/write data and commands for various settings or the like are transferred to/from the main body apparatus via the ATA interface circuit 11 and connector 4. The basic specifications of the connector 4, housing, and hard disk drive 20 comply with iVDR hard disk drive hardware standards/interface standards. That is, the hard disk cartridge 1 is constituted as an iVDR disk.

An eject signal is output from the output port of the control circuit 10 to the connector 4. The signal is not defined by iVDR hard disk drive hardware standards, and is assigned to an unused pin (this embodiment adopts 44 pins) of the connector 4 in iVDR hard disk drive hardware standards.

FIG. 2 shows the arrangement of the main body apparatus which stores the removable hard disk cartridge 1. The removable hard disk cartridge 1 is illustrated in FIG. 1. A connector 5 which engages with the connector 4, and eject rollers 31 and 32 are arranged at a portion where the removable hard disk cartridge 1 is stored. Reference numeral 33 denotes a pulse motor for rotating and driving the eject rollers 31 and 32. The removable hard disk cartridge 1 is ejected by pushing out the removable hard disk cartridge 1 by rotation of the eject rollers 31 and 32. The eject mechanism may not be the eject rollers, and the removable hard disk cartridge 1 may be pushed out by a plate- or bar-like member.

Reference numeral 30 denotes a microprocessor which controls the eject rollers 31 and 32 and the pulse motor 33. In the microprocessor 30, a CPU, ROM, RAM, I/O port, motor driver, and the like are integrated into one chip. The input port of the microprocessor 30 is connected to the above-mentioned eject signal via the connectors 4 and 5. The microprocessor 30 controls the eject rollers 31 and 32 and the pulse motor 33 on the basis of the eject signal, and ejects the removable hard disk cartridge 1. In other words, the microprocessor 30, eject rollers 31 and 32, and pulse motor 33 constitute an eject mechanism for ejecting the removable hard disk cartridge 1. Reference numeral 34 denotes a pull-up resistor for pulling up the eject signal.

As shown in FIG. 2, the main body apparatus comprises a CPU 41, a ROM 42, a RAM 43, an HID port 44 which connects a human interface device such as a keyboard, mouse, or display, and an ATA interface circuit 45. The main body apparatus is an electronic device (host apparatus 40) such as a personal computer. The ATA interface circuit 45 of the host apparatus 40 and the ATA interface circuit 11 of the removable hard disk cartridge 1 are connected to each other via the connectors 4 and 5.

As described above, the portable storage unit (eject mechanism+detachable portable storage cartridge) according to the first embodiment is assembled into the host apparatus 40.

Figure 3:
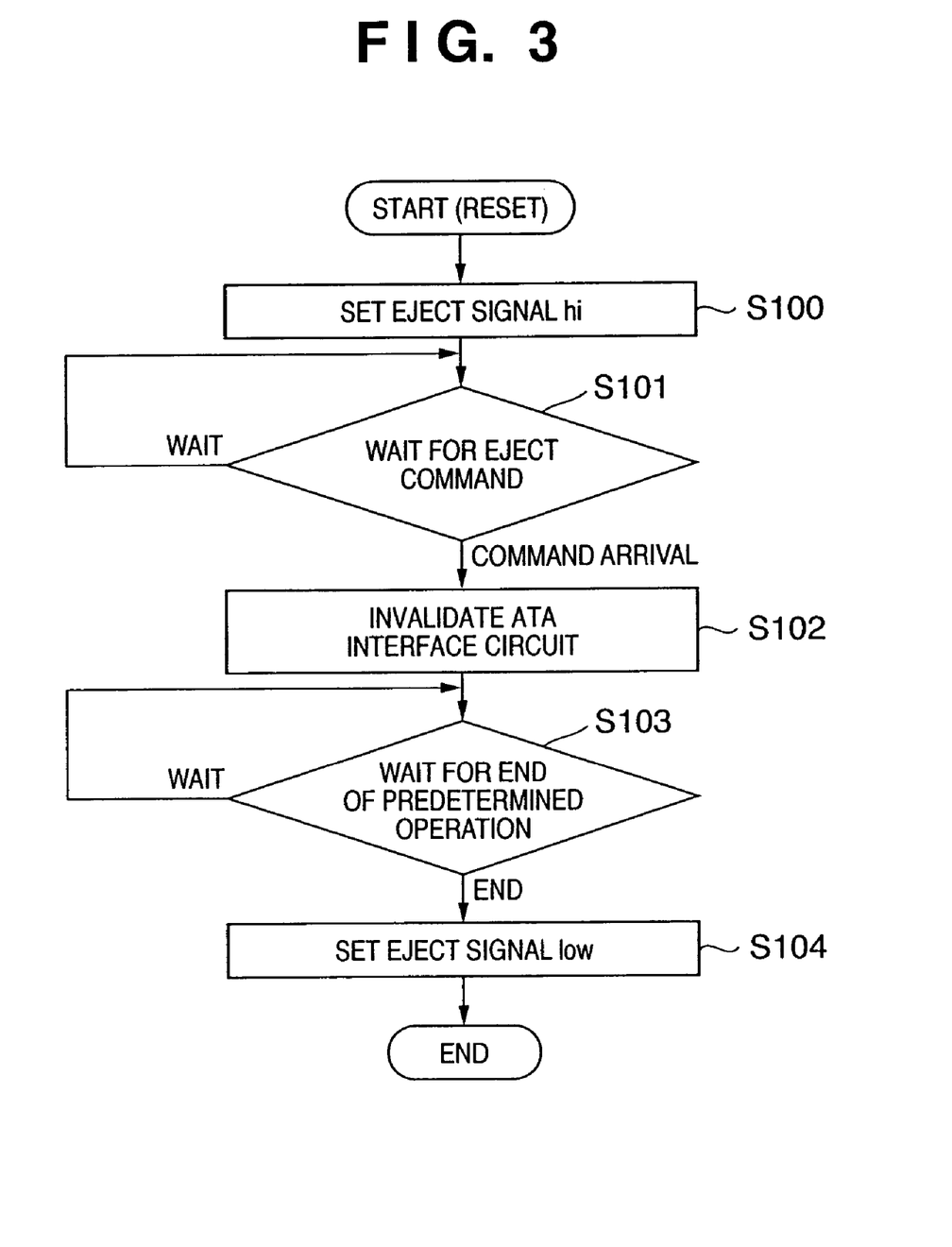
FIG. 3 is a flow chart showing operation concerning an eject signal by a control circuit 10 according to the first embodiment.

Operation concerning an eject signal will be explained with reference to FIGS. 3 and 4. FIG. 3 is a flow chart for explaining operation concerning an eject signal by the control circuit 10 in the removable hard disk cartridge 1.

If the removable hard disk cartridge 1 is inserted into the slot of the main body apparatus and the connectors 4 and 5 are connected to each other to supply power, the hard disk drive 20 is reset. In step S100, the eject signal is set high. In step S101, the control circuit 10 waits for an eject command from the host apparatus 40. The eject command can be a MEDIA EJECT command defined by an ATA interface, or can be newly defined using a vendor-defined command. The host apparatus 40 may issue an eject command (eject instruction) when the user designates eject (removal) of the removable hard disk cartridge 1 by menu operation on a pull-down menu or pull-up menu.

If the eject command arrives, the control circuit 10 invalidates the ATA interface circuit 11 in step S102 in order not to receive a subsequent command. At this time, the ATA interface circuit 11 may be invalidated by hardware, or some or all of incoming commands may be ignored by software processing of the control circuit 10. In step S103, the control circuit 10 waits for the end of predetermined operation of the hard disk drive 20. More specifically, when the RAM element in the control circuit 10 is used as a write cache memory, the control circuit 10 waits until the cache is flushed (cache contents are written in the magnetic storage medium 16). When the removable hard disk cartridge 1 is ejected after rotation of the platter 16 ends, the control circuit 10 waits for the end of rotation stop processing. These are merely examples. In any case, in step S103, the control circuit 10 waits for the end of various operations which should be executed before the removable hard disk cartridge 1 is ejected. After the end of predetermined operation, the eject signal is set low in step S104. Although not particularly illustrated in FIG. 3, the state may shift to a SLEEP mode defined by ATA interface standards after step S104.

Figure 4:
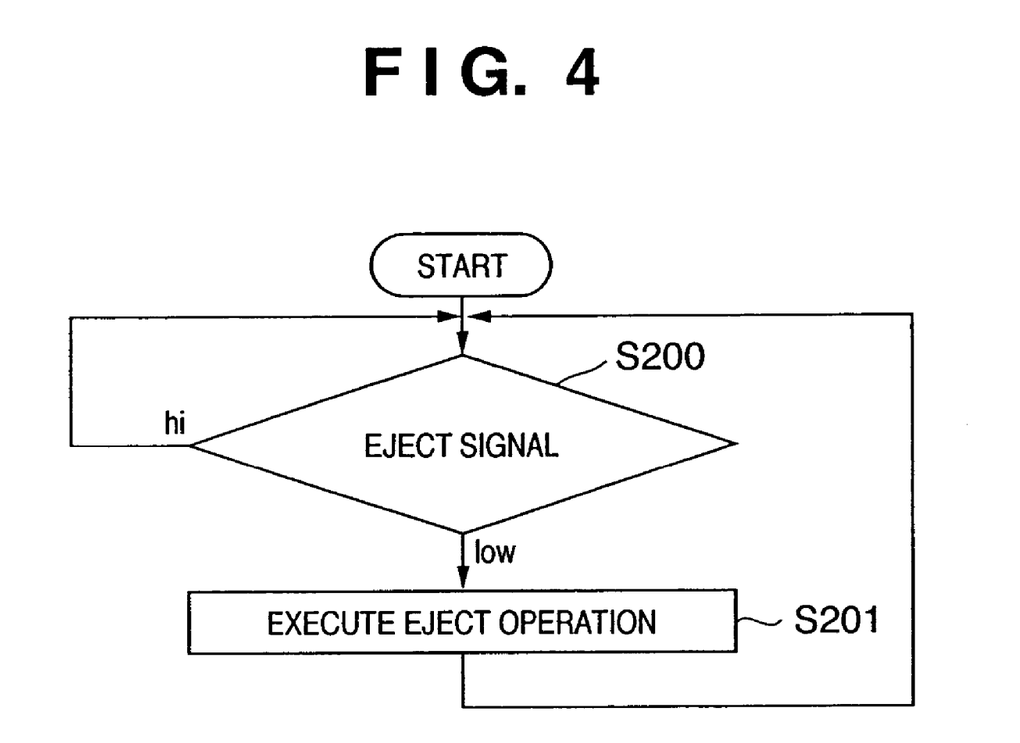
FIG. 4 is a flow chart showing operation concerning an eject signal by a microprocessor 30 according to the first embodiment.

FIG. 4 is a flow chart for explaining operation concerning an eject signal by the microprocessor 30 which controls the eject mechanism. In step S200, the microprocessor 30 waits until the eject signal is set low. After the eject signal is set low, the microprocessor 30 advances to step S201, drives and controls the eject mechanism (pulse motor 33 (eject roller 31) and the like), and executes eject operation. Upon the completion of eject operation, the microprocessor 30 returns to step S200.

After eject is completed in this manner, connection of the connectors 4 and 5 is canceled, and the eject signal is fixed to high level by the pull-up resistor 34 in FIG. 2. For this reason, the next eject operation is executed when the removable hard disk cartridge 1 is inserted again and the host apparatus 40 issues an eject command again. Note that the eject command is issued by the host apparatus 40 when, for example, the user designates eject on an operation menu provided by an eject mechanism driver application installed in the host apparatus 40.

As described above, according to the first embodiment, the host apparatus and the portable storage unit having an eject mechanism and a portable storage cartridge which allows exchange of the entire storage device (such as an iVDR disk) are connected by a single ATA interface. The portable storage cartridge can be ejected by an eject command via the ATA interface. An eject operation designation signal is finally output in accordance with decision by the storage device itself. Even if the user designates eject at an improper timing during write operation or the like, any problem such as loss of data or damage to the unit can be prevented.

Second Embodiment

In the first embodiment, eject operation is executed by an eject command via the ATA interface. Eject is desirably designated even by button operation. If, however, an eject designation switch or the like is attached to the eject mechanism and eject operation is executed immediately upon operation on the switch, important data may be lost or the unit may be damaged depending on the timing, as described in the conventional drawbacks. The second embodiment solves this problem, and allows safe eject of a storage unit even by operating the eject designation switch.

Figure 5:
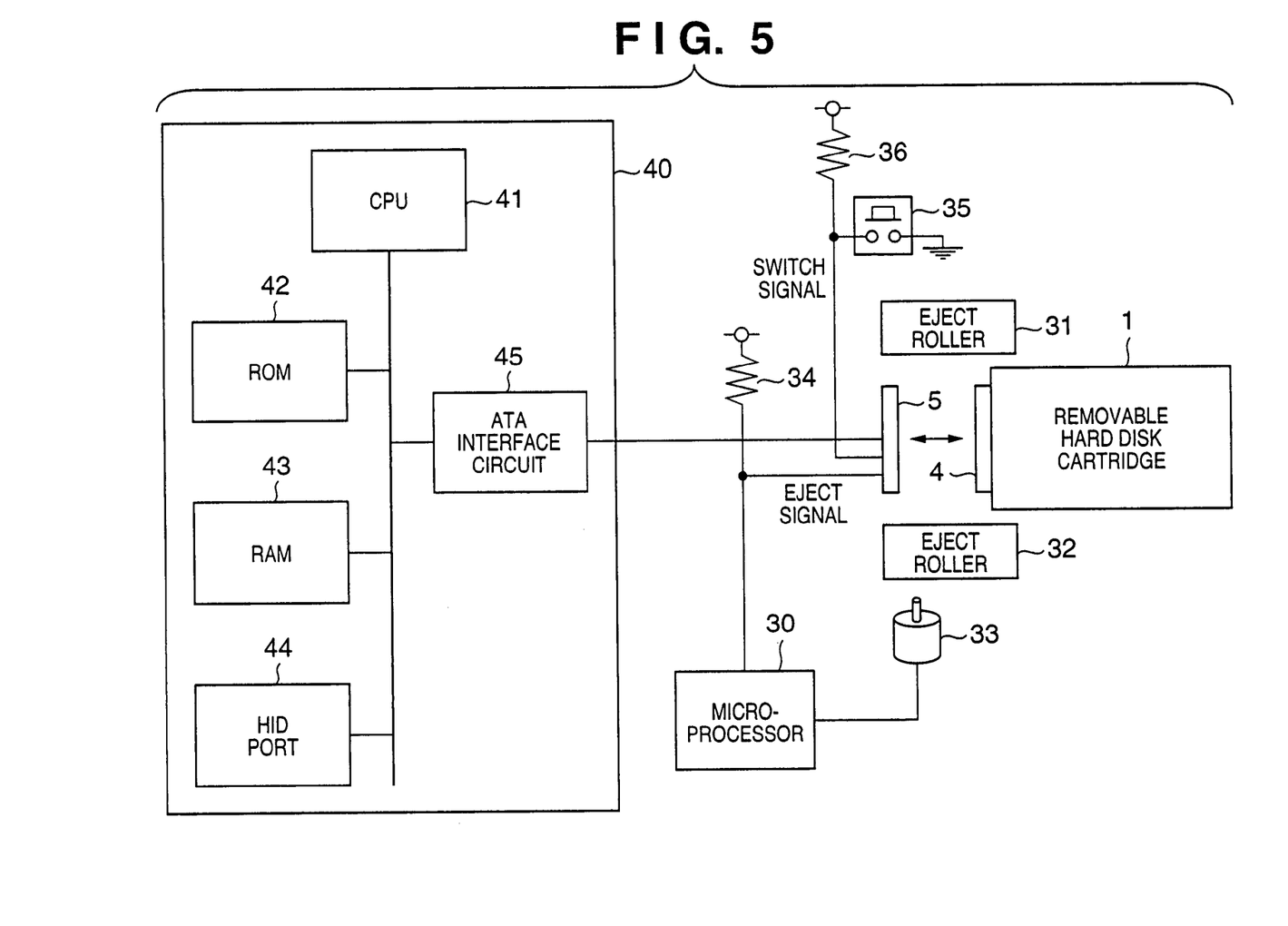
FIG. 5 is a view showing the arrangement of a host apparatus according to the second embodiment.

FIG. 5 shows the arrangement of the main body apparatus according to the second embodiment. This arrangement is different from the arrangement (FIG. 2) according to the first embodiment in the presence of a tact switch (push button) 35 for designating eject. The tact switch 35 is connected not to a microprocessor 30 which controls the eject mechanism, but to a removable hard disk cartridge 1 via connectors 4 and 5. One terminal of the tact switch 35 is grounded, and the other terminal is pulled up by a pull-up resistor 36. When the tact switch 35 is "closed", a "low" signal is output to the removable hard disk cartridge 1, and when the tact switch 35 is "open", a "high" signal is output.

Figure 6:
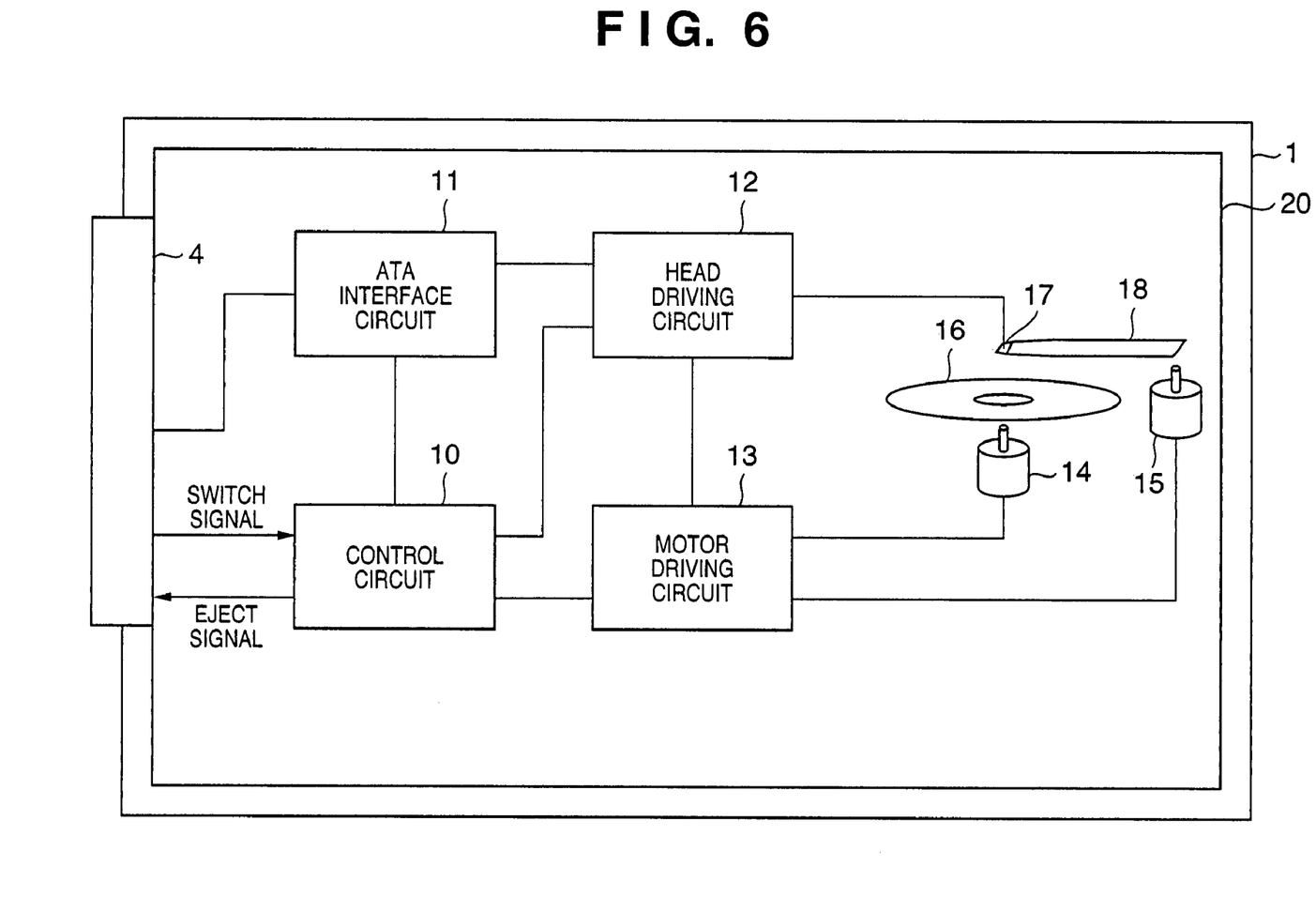
FIG. 6 is a view showing the arrangement of a removable hard disk cartridge according to the second embodiment.

FIG. 6 is a view showing the arrangement of the removable hard disk cartridge 1 according to the second embodiment. As is apparent from FIG. 6, a signal (switch signal) from the tact switch 35 is connected to the input port of a control circuit 10. Similar to an eject signal, the switch signal is not defined by iVDR hard disk drive hardware standards, and is assigned to an unused pin (this embodiment adopts 45 pins) of the connector 4 in iVDR hard disk drive hardware standards.

Figure 7:
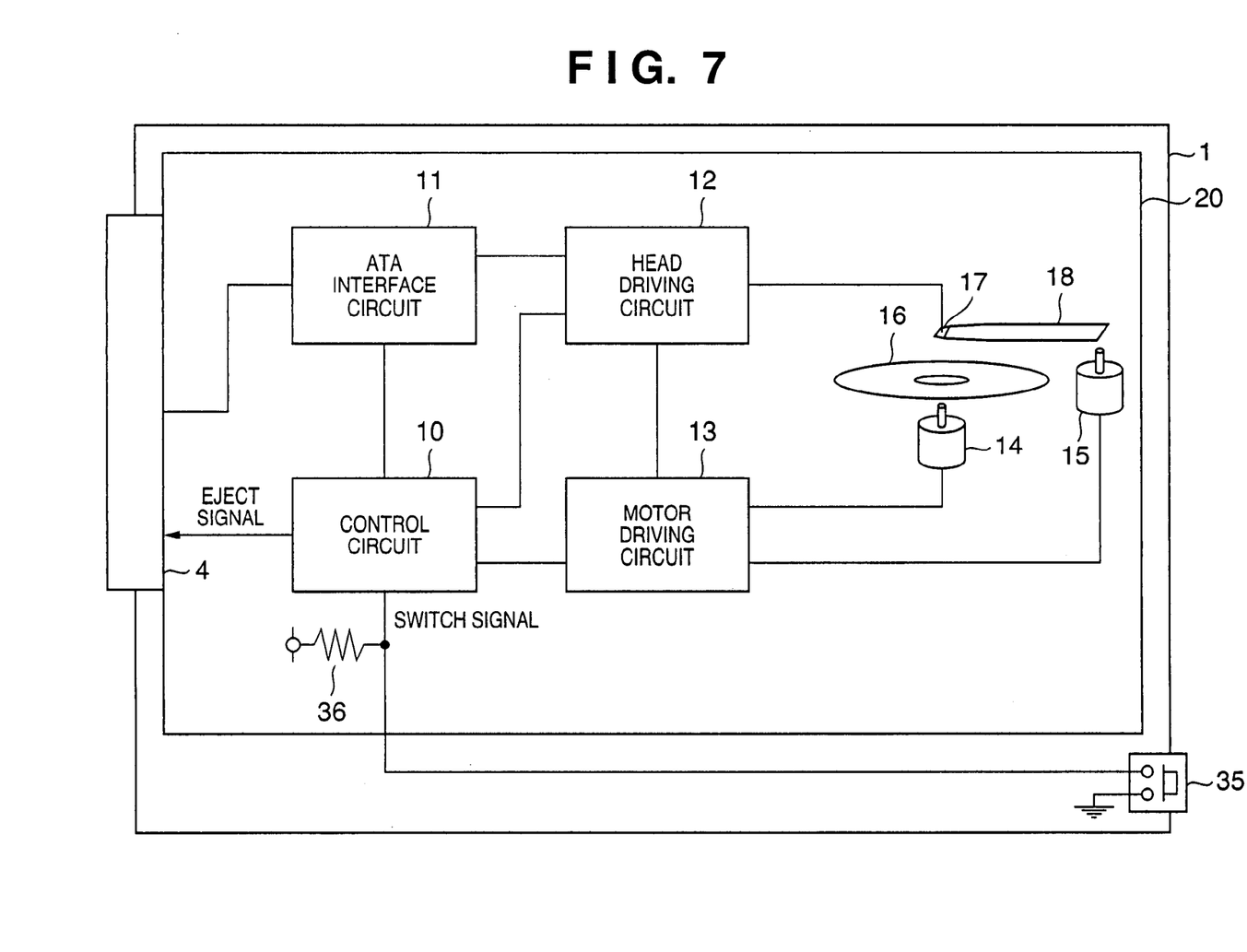
FIG. 7 is a view showing another arrangement of the removable hard disk cartridge according to the second embodiment.

The tact switch 35 can be arranged not in the main body apparatus as shown in FIG. 5, but in the removable hard disk cartridge 1. For example, as shown in FIG. 7, the tact switch 35 may be arranged on a surface of the housing of the removable hard disk cartridge 1 that is opposite to the connector 4.

Operation concerning an eject signal is the same as that described in the first embodiment with reference to FIGS. 3 and 4, and the operation of the eject mechanism is the same as that in the first embodiment. In the second embodiment, operation concerning the tact switch 35 which designates eject is added. Operation concerning the tact switch 35 which designates eject will be explained in detail with reference to the flow charts of FIGS. 8 to 10.

Figure 8:
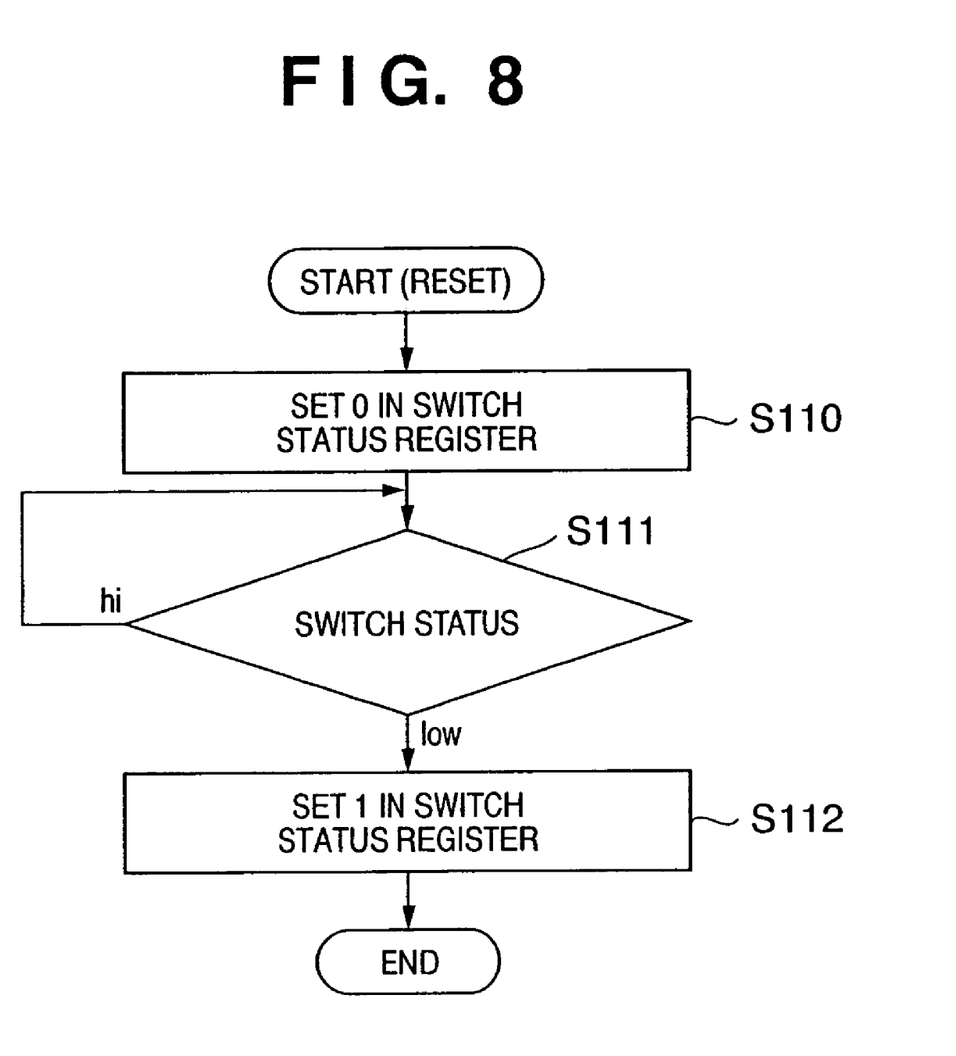
FIG. 8 is a flow chart for explaining status monitoring operation on a tact switch 35 in a control circuit 10 according to the second embodiment.

FIG. 8 is a flow chart showing status monitoring operation on the tact switch 35 in the control circuit 10 of the removable hard disk cartridge 1. An area (switch status register) where the status of the tact switch 35 is stored is set in the RAM of the control circuit 10. After reset upon mounting in a host apparatus or the like, the switch status register is set to 0 in step S110. In step S111, the status of the tact switch 35 is monitored. The status of the tact switch 35 can be determined by the level of a switch signal connected to the control circuit 10. If the level is high, i.e., the tact switch 35 is "open", step S111 is repeated without any processing. If the level is "low", i.e., the tact switch 35 is "closed", the switch status register is set to 1 in step S112.

This processing implements a status register which waits until the tact switch 35 is "closed", and after the tact switch 35 is "closed", latches and holds the status. The switch status register can be monitored by a host apparatus 40 via an ATA interface. As a concrete implementation method, a command (switch status monitoring command) which sends back a switch status is newly defined using a vendor-defined command.

Figure 9:
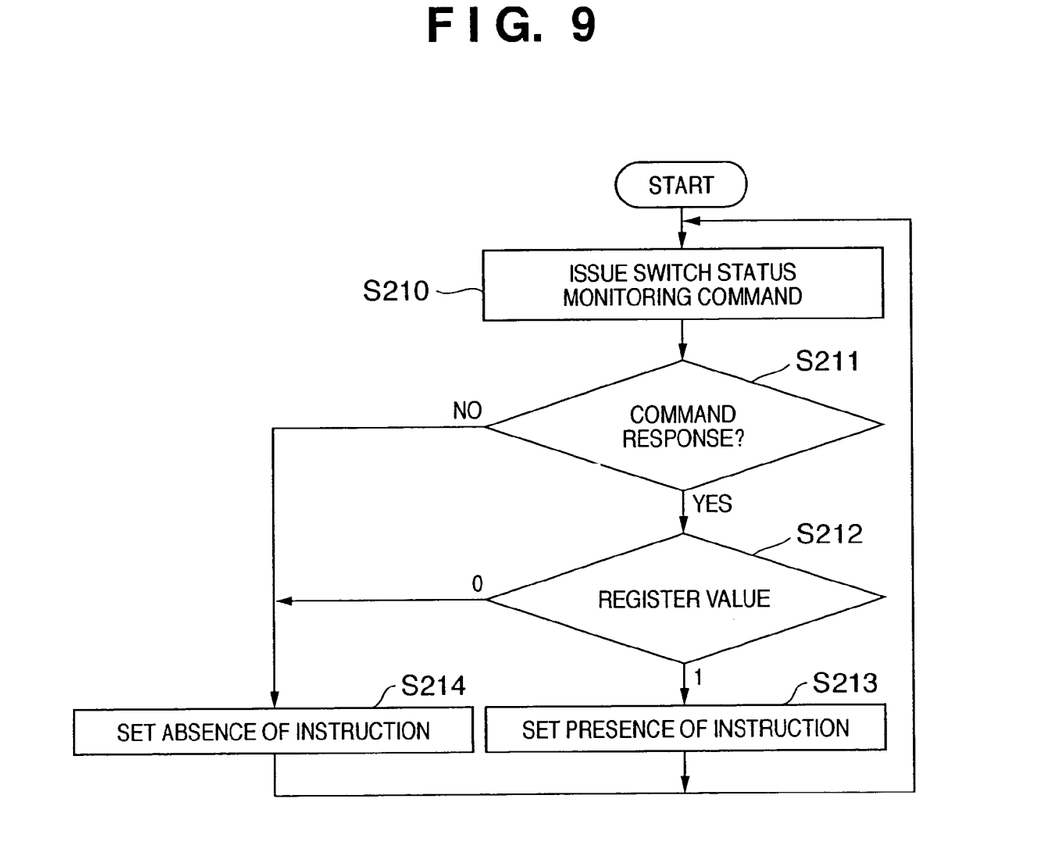
FIG. 9 is a flow chart showing polling operation of a switch status register in a host apparatus 40 according to the second embodiment.

FIG. 9 is a flow chart showing polling operation of the switch status register in the host apparatus 40. A register area where the presence/absence of eject switch designation is stored is set in a RAM 43. In step S210, a switch status monitoring command is issued. In step S211, the presence/absence of a response is determined. If no response is received, the removable hard disk cartridge 1 is not mounted. In step S214, the eject switch register is set to "absence of designation".

If a command response is received in step S211, the value is determined in step S212. For a response representing a switch status register value "0", the processing advances to step S214, and the eject switch designation register is set to "absence of designation". For a response representing a switch status register value "1" in step S212, the processing advances to step S213, and the eject switch designation register is set to "presence of designation". This processing is repetitively executed at a proper interval. That is, the host apparatus 40 always monitors the switch status register by polling operation. Instead of polling operation, it is also possible that when the tact switch 35 is "closed", the control circuit 10 in the removable hard disk cartridge 1 asserts the INTRQ signal (interrupt request signal) of the ATA interface, the host apparatus 40 acquires the content of the switch status register by interrupt processing corresponding to the INTRQ signal, and as a result, the switch designation register is set. To assert the INTRQ signal, for example, a command (switch status change detection command) which waits until the tact switch 35 is "closed" is newly defined, and the INTRQ signal is asserted as a notification of the completion of the switch status change detection command (i.e., detection of a change from the "open" status to "closed" status of the tact switch 35). The switch status monitoring command and switch status change detection command may be defined as the same command.

Figure 10:
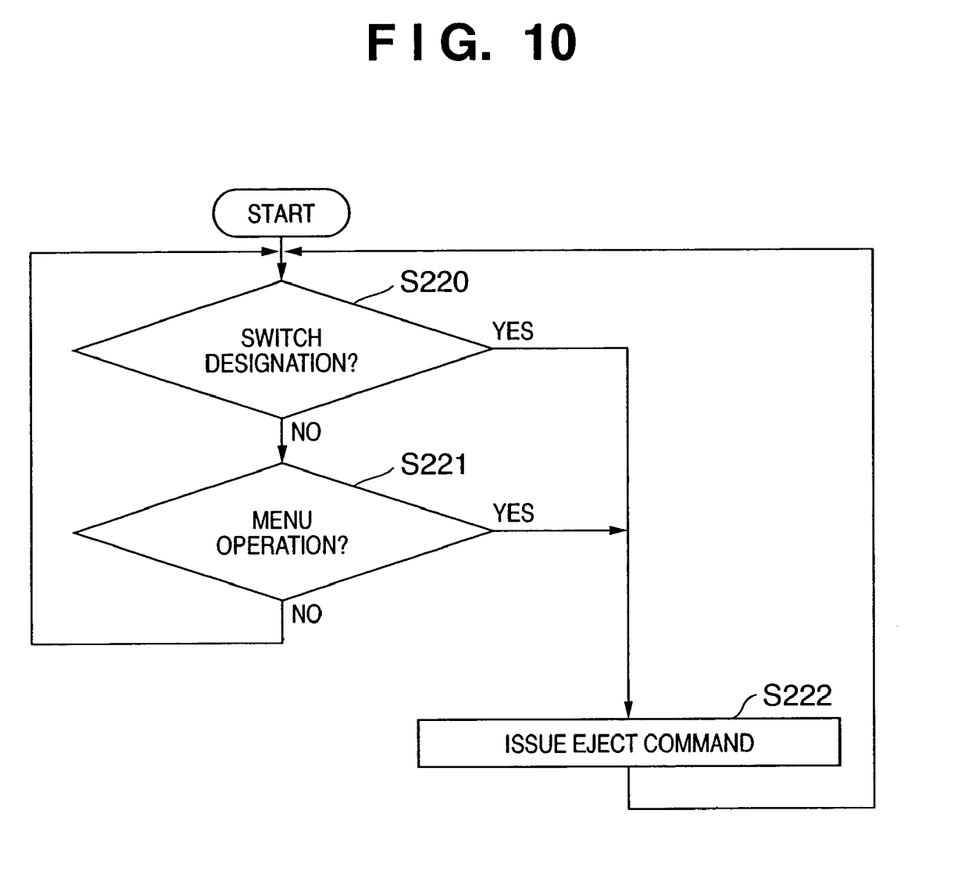
FIG. 10 is a flow chart showing operation of issuing an eject command by the host apparatus 40 according to the second embodiment.

FIG. 10 is a flow chart showing operation of issuing an eject command by the host apparatus 40. In step S220, the presence/absence of switch designation that is set in steps S213 and S214 is determined. If YES in step S220, the processing advances to step S222 to issue an eject command. In step S221, the presence/absence of user's menu operation which designates eject is determined. If eject designation operation from the operation menu described in the first embodiment has been done, an eject command is issued in step S222. If NO in steps S220 and S221, no eject command is issued. This processing is repetitively executed at a proper interval.

Processing after issuing an eject command is the same as that in the first embodiment, and a description thereof will be omitted.

As described above, according to the second embodiment, the status of the eject designation switch can be monitored by the host apparatus via the ATA interface. Even when operation on the eject designation switch is adopted, a portable storage cartridge can be ejected by an eject command via the ATA interface. Although the portable storage cartridge is formally always ejected by an eject command from the host apparatus, eject can be substantially (in other words, from the user's viewpoint) designated by both menu operation and switch operation.

Third Embodiment

In the second embodiment, the host apparatus 40 must be involved in polling operation or interrupt processing which realizes eject by switch operation. However, such processing operation may be heavy depending on the performance of the host apparatus 40. In the third embodiment, the status of the eject designation switch is monitored by a removable hard disk cartridge 1.

The hardware arrangement is the same as that in FIGS. 5 and 6 (or 7) in the second embodiment, and an illustration thereof will be omitted. The third embodiment is different in processing operation of a control circuit 10 in the removable hard disk cartridge 1.

Figure 11:
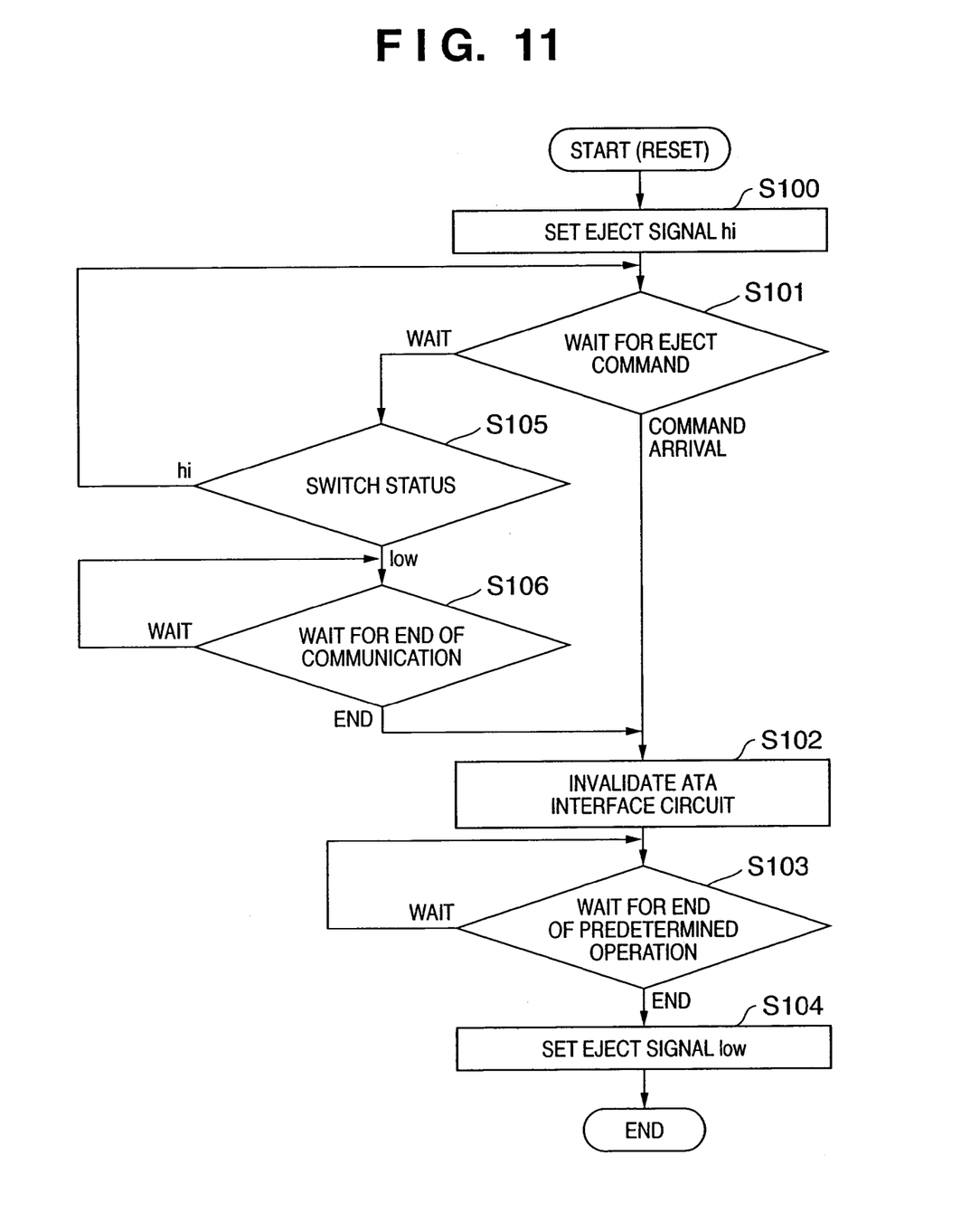
FIG. 11 is a flow chart showing operation concerning an eject signal by a control circuit 10 according to the third embodiment.

FIG. 11 is a flow chart showing processing concerning an eject signal and tack switch (eject designation switch) by the control circuit 10 according to the third embodiment. Processes in steps S100 to S104 of FIG. 11 are the same as those shown in FIG. 3 according to the first embodiment. The flow chart of FIG. 11 is different from that of FIG. 3 in that steps S105 and S106 are added.

If no eject command arrives in step S101, the status of a tact switch 35 is determined in step S105. If the level of the switch signal is high, i.e., the tact switch 35 is "open", the processing returns to step S101. If the level of the switch signal is low, i.e., the tact switch 35 is "closed", the processing advances to step S106 to wait for the end of current communication in the ATA interface. That is, the control circuit 10 monitors input of an eject command and the status of the tact switch 35. If input of an eject command is detected, the processing advances to step S102; if the closed state of the tact switch is detected, the processing waits for the end of communication (step S106), and then advances to step S102.

In step S102, the ATA interface circuit 11 is invalidated, and the same processing as that shown in FIG. 3 is executed. That is, if an eject command arrives or the tact switch 35 is operated, a "low" eject signal is controlled to be output.

According to the third embodiment, the storage device in the portable storage cartridge monitors operation on the eject designation switch. The portable storage unit capable of ejecting a portable storage cartridge by either an eject command or operation on the eject designation switch via the ATA interface can be implemented without any polling operation or interrupt processing operation of the host apparatus.

In the operation flow chart of FIG. 11, processing of invalidating designation of eject operation by operation on the eject designation switch (tact switch 35) is not particularly performed. However, a command which inhibits/permits eject designation by the eject designation switch may be newly defined using a MEDIA LOCK/UNLOCK command defined by the ATA interface or a vendor-defined command, and eject designation by the eject designation switch may be inhibited/permitted by the host apparatus.

As described above, according to the above-described embodiments, a portable storage unit having an eject mechanism and a portable storage cartridge which allows exchange of the entire storage device (such as an iVDR disk) can be connected to a host apparatus by a single ATA interface. The portable storage unit capable of safely ejecting a portable storage cartridge by an eject command via the ATA interface can be implemented.

The second and third embodiments adopt an eject designation switch without arranging any additional signal line to the host apparatus. A portable storage cartridge can also be ejected by operating the eject designation switch. In any embodiment, an eject operation designation signal is finally output in accordance with decision by the storage device itself. Even if the user designates eject at an improper timing during write operation or the like, any problem such as loss of data or damage to the unit can be safely prevented.

As has been described above, according to the present invention, a mounted storage unit can be ejected by an eject command via an interface which connects an information processing apparatus and the detachable storage unit.

According to the present invention, the information processing apparatus and storage unit can be connected by a single interface.

According to the present invention, the storage unit can always be safely ejected from the information processing apparatus regardless of the eject designation timing.

As many apparently widely different embodiments of the present invention can be made without departing from the spirit and scope thereof, it is to be understood that the invention is not limited to the specific embodiments thereof except as defined in the claims.

What is claimed is:

1. A storage unit which is detachable from an information processing apparatus having an ejecting unit configured to eject the storage unit, the storage unit having a storage medium for storing data from the information processing apparatus, comprising:

a controller for controlling storage of data into the storage medium;

a receiving unit configured to receive an eject instruction to eject the storage unit from the information processing apparatus;

an invalidation unit configured to invalidate a connection with the information processing apparatus when said receiving unit receives the eject instruction;

a waiting unit configured to wait until an operation which should be complete in the storage unit before the storage unit is elected is complete, after said invalidation unit starts to invalidate the connection; and an output unit configured to output an eject permission signal, as a response to the eject instruction, to the information processing apparatus for ejecting the storage unit by said ejecting unit after completion of the wait of said waiting unit, wherein said invalidation unit, said waiting unit and said output unit are arranged inside the storage unit which is ejected from the information processing apparatus by operation of said ejecting unit that ejects the storage unit in response to the eject permission signal.

2. The storage unit according to claim 1, wherein said output unit uses an extra signal line.

3. The storage unit according to claim 1, wherein said receiving unit receives an eject command as the eject instruction.

4. The storage unit according to claim 1, wherein said receiving unit receives a status of an operation switch as the eject instruction via an extra signal line.

5. The storage unit according to claim 4, wherein the operation switch is arranged in the storage unit.

6. The storage unit according to claim 1, wherein said receiving unit further comprises:
a switch receiving unit configured to receive a status of an operation switch; and
a notification unit configured to notify the information processing apparatus of an operation status of the operation switch on the basis of the status of the operation switch that is received by said switch receiving unit.

7. An information processing apparatus which allows detaching of a storage unit as defined in claim 6, comprising:
a monitoring unit configured to inquire of the storage unit as to a status of the operation switch, and to monitor a status signal representing the status of the operation switch;
an issuing unit configured to issue the eject instruction to the storage unit in accordance with a user operation to a user interface provided by software or the status signal; and
an eject unit configured to eject the storage unit on the basis of the eject permission signal which is output from the storage unit in accordance with the eject instruction.

8. An information processing apparatus which allows detaching of a storage unit as defined in claim 1, comprising:
a providing unit configured to provide a user interface;
an issuing unit configured to issue the eject instruction to the storage unit in accordance with a user operation to the user interface; and
an eject unit configured to eject the storage unit on the basis of the eject permission signal which is output from the storage unit in accordance with the eject instruction.

9. A housing apparatus which allows detaching of a storage unit as defined in claim 1, and which can be connected to an information processing apparatus, comprising:
an interface which realizes data communication between the storage unit and the information processing apparatus;
a transmission unit configured to transmit the eject instruction from the information processing apparatus to the storage unit; and
an eject mechanism which ejects the storage unit in accordance with the eject permission signal from the storage unit.

10. The apparatus according to claim 9, wherein the apparatus further comprises:
an eject designation switch,
wherein said transmission unit transmits the eject instruction to the storage unit in accordance with operation of said eject designation switch.

11. The storage unit according to claim 1, wherein said receiving unit, after reception of the eject instruction, ignores a subsequent ejection instruction.

12. The storage unit according to claim 1, wherein the operation waited on includes flashing a write cache memory arranged inside the storage unit and/or ending a rotation of a platter arranged inside the storage unit.

13. An eject control method for a storage unit which is detachable from an information processing apparatus having an ejecting unit configured to eject the storage unit, the storage unit having a storage medium for storing data from the information processing apparatus, and a controller for controlling storage of data into the storage medium, comprising:
a receiving step of receiving, by the storage unit, an eject instruction to eject the storage unit from the information processing apparatus;
an invalidation step of invalidating, by the storage unit, a connection with the information processing apparatus when the eject instruction is received in said receiving step;
a waiting step of waiting, by the storage unit, until an operation which should be complete in the storage unit before the storage unit is ejected is complete, after said invalidation step starts to invalidate the connection; and
an output step of outputting, from the storage unit, an eject permission signal, as a response to the eject instruction, to the information processing apparatus for ejecting the storage unit by said ejecting unit after completion of the wait of said waiting unit,
wherein the storage unit is ejected from the information processing apparatus by operation of said ejecting unit that ejects the storage unit in response to the eject permission signal.

14. The method according to claim 13, wherein the operation waited on includes flashing a write cache memory arranged inside the storage unit and/or ending a rotation of a platter arranged inside the storage unit.

* * * * *